Figure 1:
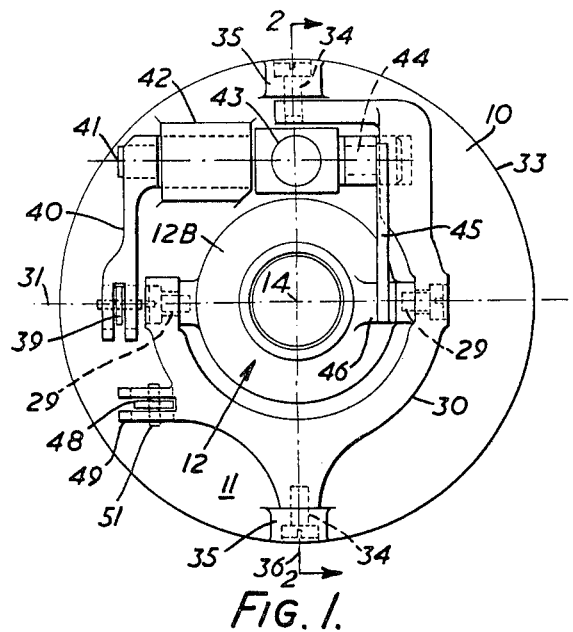

United States Patent [19]

Martin

[11] 4,350,297
[45] Sep. 21, 1982

[54] SWIVELLING EXHAUST NOZZLES FOR ROCKET MOTORS

[76] Inventor: Frank Martin, Cranford La., Heston, Middlesex, England

[21] Appl. No.: 207,821

[22] Filed: Jul. 5, 1962

[30] Foreign Application Priority Data

Jul. 5, 1961 [GB] United Kingdom ............... 24371/61

[51] Int. Cl.$^3$ ............................................. F02K 9/84
[52] U.S. Cl. ................................ 239/265.35; 239/587
[58] Field of Search .............. 60/35.54, 35.55, 35.6 N, 60/35.6 R; 239/265.35, 587

[56] References Cited

U.S. PATENT DOCUMENTS

| | | | |
|---|---|---|---|
| 2,713,768 | 7/1955 | Livingston et al. | 60/35.6 R |
| 3,003,312 | 10/1961 | Jewell | 60/35.55 |
| 3,039,264 | 6/1962 | Ernest | 60/35.55 |
| 3,046,736 | 7/1962 | Thomson | 60/35.55 |
| 3,049,877 | 8/1962 | Sherman | 60/35.55 |
| 3,050,938 | 8/1962 | Twyford | 60/35.55 |
| 3,064,419 | 11/1962 | Ward | 60/35.55 |
| 3,069,852 | 12/1962 | Stricker | 60/35.55 |
| 3,070,957 | 1/1963 | McCorkle | 60/35.55 |
| 3,101,591 | 8/1963 | Wise | 60/35.54 |

Primary Examiner—Stephen C. Bentley

EXEMPLARY CLAIM

1. A rocket motor having a body and an exhaust nozzle which comprises a tubular main part fixed to the motor body and a hollow nozzle extension containing the nozzle mouth, with an exhaust axis, the extension being sealed to the main part of the nozzle by means of a universal joint of the spherical ball-joint type, a gimbal ring supported by the body of the motor and pivotally connected thereto about a first pivot axis transverse to the nozzle exhaust axis, the nozzle extension being pivotally supported in the gimbal ring for pivotal movements about a second pivot axis transverse to the nozzle exhaust axis and normal to the said first pivot axis, means for turning the gimbal ring relative to the motor body about the first pivot axis, including first actuating means with a first linkage operatively connected to the gimbal ring, and means for independently turning the nozzle extension relative to the gimbal ring about the second pivot axis, including second actuating means with a second linkage operatively connected to said nozzle extension, said second linkage including a first shaft supported in a bearing carried by the motor body for rotation about a fixed axis perpendicular to said first pivot axis, a second shaft supported by the gimbal ring on an axis parallel to said second pivot axis and operatively connected to said nozzle extension, and a universal coupling whose center lies on said first pivot axis, operatively connected between said two shafts.

4 Claims, 5 Drawing Figures

SWIVELLING EXHAUST NOZZLES FOR ROCKET MOTORS

This invention relates to rocket motors, and is concerned with enabling an extension of the exhaust nozzle of a rocket motor to be swivelled universally to point in any required direction in a limiting cone of inclination, for the purpose of directional control of a missile or other body on which the motor is mounted.

According to the present invention, the exhaust nozzle extension of a rocket motor is sealed to the main part of the nozzle by means of a universal joint of the spherical ball-joint type and is pivoted about a pivotal axis transverse to the nozzle exhaust axis to a gimbal ring which is itself pivoted to the body of the motor about an axis transverse to the nozzle exhaust axis and at right angles to the pivotal axis of the nozzle, and means is provided for turning the nozzle extension about the pivotal axis relatively to the gimbal ring, and for simultaneously turning the gimgal ring about its pivotal axis relatively to the motor body.

The turning of the nozzle extension and the gimbal ring about their respective pivotal axes may be effected through separate linkages by means of separate actuators, for example compressed-gas-operated pneumatic jacks, one of the linkages incorporating a universal joint.

According to another aspect of the invention, the fixed main part of the nozzle, to which the swivelling nozzle extension is sealed by means of a universal joint of the spherical ball-joint type, projects rearwardly from the body of the rocket motor and is secured thereto by means of an adjustable securing means capable of adjustment in any direction transverse to the exhaust axis of the motor body, whereby precise alignment can be readily achieved between the non-swivelling main part of the nozzle and the gimbal-mounted swivelling extension.

Figure 2:
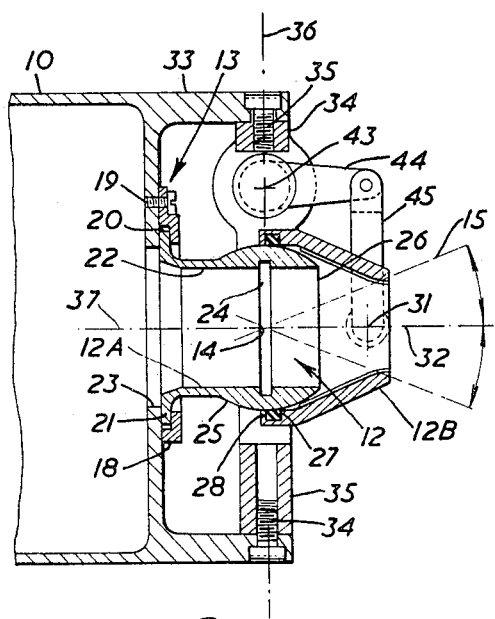
Figure 3:
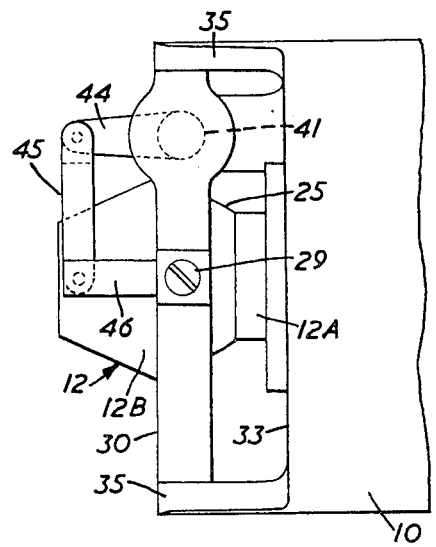

The invention may be carried into practice in various ways, but one specific embodiment will now be described by way of example only with reference to the accompanying drawings, in which FIG. 1 is a rear end view of a rocket motor showing its exhaust nozzle, FIGS. 2 and 3 are respectively sectioned and unsectioned side views from opposite sides of the end portion, nozzle and nozzle swivelling means of the motor of FIG. 1

FIG. 2 being a cross-section on the line 2—2 in FIG. 1, and

Figure 4:
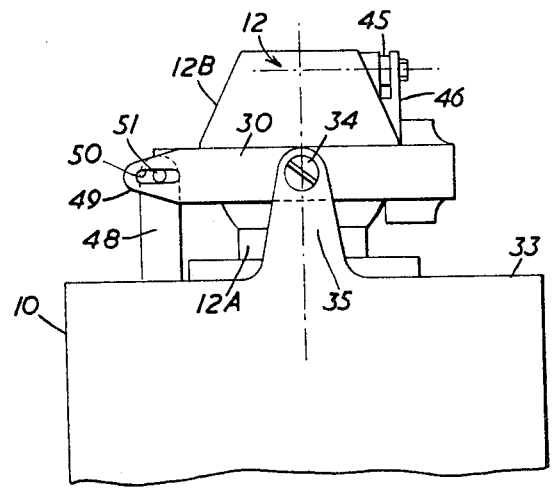
Figure 5:
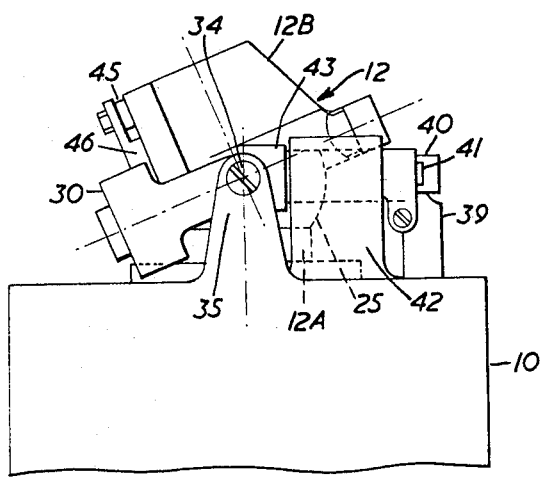

FIGS. 4 and 5 are respectively plan and underneath plan views of the rear end, nozzle and swivelling means of the motor of FIG. 1.

In the illustrated embodiment a rocket motor for the propulsion and/or directional control of a missile comprises a motor body 10 through the rear end of which the jet of hot propulsion gases produced by the burning of a propulsive charge in the body 10 is discharged through a nozzle generally indicated at 12. The nozzle 12 comprises two portions, namely a fixed main nozzle portion 12A which is mounted on the end bulkhead 11 of the motor body by attachment means generally indicated at 13, and a tubular extension piece 12B capable of being swivelled universally about a centre 14 within a limiting cone of inclination indicated at 15 for the purpose of varying the direction of thrust of the motor.

The securing means 13 for the nozzle member 12A comprises a retainer ring 18 bolted to the bulkhead by means of bolts 19. The retainer ring 18 has an annular step 20 forming a recess in which an annular peripheral flange 21 on the nozzle member 12A is trapped, the flange 21 being of less radius than the step 20 so that a limited adjustment of the position of the nozzle member 12A in any radial direction can be made before the bolts 19 securing the retainer ring 18 to the bulkhead 11 are finally tightened up.

The swivelling nozzle extension 12B is mounted by means of a universal joint of the spherical ball-joint type on the tubuler main nozzle member 12A.

The tubular nozzle member 12A protrudes rearwardly from the rocket body 10, with its bore 22 in alignment with an aperture 23 in the bulkhead 11 so that it will receive the protruding rear end of a solid-fuel charge cartridge (not shown) when inserted into the body. A circumferential internal groove 24 in the nozzle member 12A aligns with the rear end of the charge cartridge and secures the latter by means of a cooperating spring clip. At its rear end the nozzle member 12A is formed with a part-spherical external bearing surface 25 around its open mouth 26, and the swivelling nozzle extension 12B, which is generally of open-ended frusto-conical form, surrounds this bearing surface 25 at its larger end and is sealed to it by means of a sealing ring 27 mounted in an internal recess in the rim 28 of the extension 12B at its larger end. The bearing surface 25 and the sealing ring 27 together constitute the universal ball-joint.

The nozzle extension 12B is pivotally mounted by means of coaxial bearings 29 carried by the gimbal ring 30, for rotation about a pivotal axis 31 which is transverse to the cone axis 32 of the extension 12B. The gimbal ring 30 is pivotally mounted on a rearwardly directed axial flange 33 of the rocket motor body 10, by means of radially-inwardly-directed pivot pins 34 carried by lugs 35 protruding from the body flange 33. Moreover the pivotal axis 36 of the gimbal ring 30 is at right angles to that of the nozzle member 12B, both these axes 31 and 36 lying in a common plane transverse to the fore-and-aft axis 37 of the rocket motor body 10.

Separate means are provided for turning the gimbal ring 30 about its pivotal axis 36 in the body 10, and for turning the nozzle extension 12B about its pivotal axis 31 in the gimbal ring 30. These means comprise separate pneumatic actuators (not shown) of the hot-gas-operated piston type, respectively coupled to the gimbal ring 30 and to the nozzle extension 12A. Thus one actuator is coupled by a link 39 to a radius arm 40 protruding from a shaft 41 journalled in a lug 42 projecting from the bulkhead 11 with its axis 42 at right angles to the pivotal axis 36 of the gimbal ring. The shaft 41 incorporates a universal joint 43, beyond which it carries a second radius arm 44 coupled by a link 45 to a lug 46 on the nozzle extension 12B, so that rotation of the shaft 41 by the associated actuator serves to turn the nozzle extension 12B around the axis 31 of its pivotal bearings 29, irrespective of the orientation of the gimbal ring 30. The centre of the universal joint 43 lies on the pivotal axis 36 of the gimbal ring. The second actuator is coupled directly by means of a link 48 to a lug 49 formed on the gimbal ring 30 at a point spaced from its pivotal axis 36. The lug 49 is formed with a slot 50 in which is trapped a pin 51 carried by the link 48.

Thus by appropriate operation of the two actuators separately or in unison, it is possible to swivel the nozzle extension 12B until it points in any desired rearward direction of inclination, within the limiting core 15 prescribed by the restrictions of the mechanism. This limiting cone 15 is defined by a generator inclined at 22° to the longitudinal axis 37 of the fixed nozzle member 12A.

The radial adjustment provided at the anchorage 13 of the tubular fixed nozzle member 12A to the bulkhead 11 of the rocket body 10 enables the nozzle member 12A to be very accurately aligned with the gimbal-mounted swivelling extension 12B, so that the centre of rotation of the extension 12B can be made to coincide precisely with the centre of the spherical bearing surface 25 of the nozzle member 12A. In this way risk of the annular sealing ring 27 making an imperfect seal, or even being pulled off the spherical bearing surface 25, and risk of jamming of the two universally-jointed members 12A and 12B due to eccentricity of the two parts of the joint, can be avoided.

What we claim as our invention and desire to secure by Letters Patent is:

1. A rocket motor having a body and an exhaust nozzle which comprises a tubular main part fixed to the motor body and a hollow nozzle extension containing the nozzle mouth, with an exhaust axis, the extension being sealed to the main part of the nozzle by means of a universal joint of the spherical ball-joint type, a gimbal ring supported by the body of the motor and pivotally connected thereto about a first pivot axis transverse to the nozzle exhaust axis, the nozzle extension being pivotally supported in the gimbal ring for pivotal movements about a second pivot axis transverse to the nozzle exhaust axis and normal to the said first pivot axis, means for turning the gimbal ring relative to the motor body about the first pivot axis, including first actuating means with a first linkage operatively connected to the gimbal ring, and means for independently turning the nozzle extension relative to the gimbal ring about the second pivot axis, including second actuating means with a second linkage operatively connected to said nozzle extension, said second linkage including a first shaft supported in a bearing carried by the motor body for rotation about a fixed axis perpendicular to said first pivot axis, a second shaft supported by the gimbal ring on an axis parallel to said second pivot axis and operatively connected to said nozzle extension, and a universal coupling whose center lies on said first pivot axis, operatively connected between said two shafts.

2. A rocket motor as claimed in claim 1, in which said second linkage includes a first radius arm affixed to said first shaft, a link connected to the outer end of said first radius arm and coupled to the associated second actuator, a second radius arm affixed to said second shaft, and a second link connected to the outer end of said second radius arm and to a point of the nozzle extension adjacent to the nozzle mouth.

3. A rocket motor as claimed in claim 1, in which said first linkage for turning the gimbal ring comprises a link connected at one end to said first actuator and at the other end to a point of the gimbal ring spaced from said first pivotal axis.

4. A rocket motor as claimed in claim 1, in which the fixed main part of the nozzle projects rearwardly from the body of the rocket motor and is secured thereto by means of an adjustable securing means capable of adjustment in any direction transverse to the exhaust axis of the main part of the nozzles which include an outwardly directed circumferential flange, said adjustable securing means comprising a stepped clamping ring with bolts affixing it to the nozzle body and arranged with a radially-inner circumferential margin overlying the outwardly-directed circumferential flange of the nozzle part to clamp the latter to the body, there being a radial clearance between the nozzle flange and the step of the clamping ring which permits the radial adjustment of the nozzle relatively to the motor body when the bolts are loosened, and the nozzle flange being gripped frictionally by the ring against such relative radial movement when the bolts are tightened.

* * * * *

UNITED STATES PATENT AND TRADEMARK OFFICE
CERTIFICATE OF CORRECTION

PATENT NO. : 4,350,297
DATED : September 21, 1982
INVENTOR(S) : Frank Martin

It is certified that error appears in the above-identified patent and that said Letters Patent is hereby corrected as shown below:

On The Title Page Insert:

-- /73/ Assignee:   British Aircraft Corporation Limited, London, England   --.

Signed and Sealed this

Sixteenth Day of August 1983

[SEAL]

Attest:

GERALD J. MOSSINGHOFF

Attesting Officer    Commissioner of Patents and Trademarks